US012792336B2

(12) United States Patent
Zhang et al.

(10) Patent No.: US 12,792,336 B2
(45) Date of Patent: Nov. 10, 2026

(54) IN-BOX SOFTWARE UPDATES

(71) Applicant: APPLE INC., Cupertino, CA (US)

(72) Inventors: Cheng Ran Zhang, Sunnyvale, CA (US); Chensong He, Saratoga, CA (US); John T. Perry, Portland, OR (US); Andrew J. Ringer, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 290 days.

(21) Appl. No.: 18/196,991

(22) Filed: May 12, 2023

(65) Prior Publication Data

US 2023/0393837 A1 Dec. 7, 2023

Related U.S. Application Data

(60) Provisional application No. 63/365,853, filed on Jun. 3, 2022.

(51) Int. Cl.
*G06F 8/65* (2018.01)
*H04L 9/32* (2006.01)

(52) U.S. Cl.
CPC .............. *G06F 8/65* (2013.01); *H04L 9/3213* (2013.01); *H04L 9/3247* (2013.01); *H04L 9/3268* (2013.01)

(58) Field of Classification Search
CPC ... H04L 9/3268; H04L 9/3247; H04L 9/3213; G06F 8/65
See application file for complete search history.

(56) References Cited

U.S. PATENT DOCUMENTS 11,552,803 B1 * 1/2023 Simkhada ............. H04L 9/3265
2010/0023778 A1 * 1/2010 Hauck .................. G06F 21/572 713/182

(Continued)

FOREIGN PATENT DOCUMENTS

JP 2014057023 A 3/2014
JP 2014220953 A 11/2014

(Continued)

OTHER PUBLICATIONS

International Search Report and the Written Opinion issued in PCT Application No. PCT/US2023/032952, dated Feb. 6, 2024 in 14 pages.

(Continued)

*Primary Examiner* — Shewaye Gelagay
(74) *Attorney, Agent, or Firm* — Kilpatrick Townsend & Stockton LLP

(57) ABSTRACT

In some implementations, the device may include exiting a shelf-life mode and turning on a peer-to-peer wireless protocol in response to detecting a power source. A device identifier can be provided to a host device via the peer-to-peer wireless protocol. A connection ticket authorizing the electronic device to connect to a wide area network can be received from the host device via the peer-to-peer wireless protocol. The connection ticket can be being generated by a server system using a private key. The connection ticket may include the device identifier associated with the electronic device. A connection to a wide area network can be requested from an access point using a network wireless protocol. A software update can be performed over the wide area network via the access point.

16 Claims, 10 Drawing Sheets

(56) References Cited

U.S. PATENT DOCUMENTS

| | | | | |
|---|---|---|---|---|
| 2013/0227655 | A1* | 8/2013 | Vanderveen ...... H04W 12/0431 726/4 | |
| 2013/0326495 | A1* | 12/2013 | Reunamaki ............... G06F 8/65 717/173 | |
| 2016/0285869 | A1* | 9/2016 | Truskovsky ........ H04L 63/0869 | |
| 2017/0110903 | A1 | 4/2017 | Jakubowski | |
| 2019/0045021 | A1* | 2/2019 | Burd ................... H04L 12/2825 | |
| 2020/0374121 | A1* | 11/2020 | Momchilov .......... H04L 9/0825 | |
| 2021/0249879 | A1 | 8/2021 | Goodchild et al. | |
| 2021/0274273 | A1 | 9/2021 | Chawan et al. | |
| 2022/0102995 | A1 | 3/2022 | Fieldbinder et al. | |
| 2022/0294854 | A1* | 9/2022 | Tikhomirov ........ H04L 63/1441 | |

FOREIGN PATENT DOCUMENTS

| | | | |
|---|---|---|---|
| JP | 2016099848 | A | 5/2016 |
| JP | 2017103335 | A | 6/2017 |
| JP | 2019510450 | A | 4/2019 |
| JP | 2020535786 | A | 12/2020 |
| WO | 2021236088 | A1 | 11/2021 |

OTHER PUBLICATIONS

Office Action issued in Japan Application No. JP2025-514123, dated Jan. 22, 2026 in 6 pages.

International Preliminary Report on Patentability issued in PCT Application No. PCT/US2023/032952, dated Apr. 3, 2025 in 8 pages.

* cited by examiner

Device Provisioning

Device Authorization

400

Device DeAuthlisting

IN-BOX SOFTWARE UPDATES

CROSS-REFERENCE TO RELATED APPLICATIONS

This application is a non-provisional of and claims the benefit and priority under 35 U.S.C. 119(e) of U.S. Provisional Application No. 63/365,853, filed on Jun. 3, 2022, entitled "IN-BOX SOFTWARE UPDATES," which is incorporated by reference herein in its entirety for all purposes.

FIELD

The present disclosure relates generally to techniques for performing a software update of an electronic device.

BACKGROUND

Mobile devices, electronic devices, and other computers, consist of instructions, called software, and components, called hardware, that implement the instructions. The terms hardware and software acknowledge that the "hard" components are difficult to change while the "soft" instructions are malleable. For an individual product, hardware and software may be designed by separate teams with distinct timetables. In general, software may be developed on a shorter timeline because software does not need to be manufactured, assembled, and packaged before sale. Additionally, updated software versions can be developed and published to improve functionality or to address security concerns. Similar changes could take significantly longer to implement in hardware.

During manufacturing, a mobile device's hardware components are loaded with software. However due to the inconsistent hardware and software development timelines, the software may be out of date by the time the mobile device reaches a point of sale. Currently, the out-of-date software can be addressed by updating the software after the device has been purchased. A salesperson can update and configure the mobile device in the store or the customer can update the device at home, after taking the device out of the box.

Updating the device after a sale is inefficient and costly because an update can take thirty minutes or more to download and install. During installation, space in a store, and an employee, are occupied by the purchasing customer. Performing a software update after sale can mean that stores are larger and staffed with more employees than would be the case if updates were performed elsewhere.

Store efficiency and the customer experience can be improved by updating mobile devices after manufacturing but before sale. However, mobile devices are often packaged in sealed containers to protect inventory from theft or tampering. Accordingly, a method for updating mobile device software after manufacturing and without opening the device's packaging is desirable.

BRIEF SUMMARY

Certain embodiments are directed to techniques (e.g., a device, a method, a memory or non-transitory computer readable medium storing code or instructions executable by one or more processors) for performing a software update of an electronic device.

In one general aspect, the method may include the electronic device exiting a shelf-life mode and turning on a peer-to-peer wireless protocol in response to detecting a power source. A device identifier associated with the electronic device can be provided by the electronic device to a host device via the peer-to-peer wireless protocol. The electronic device can receive a connection ticket authorizing the electronic device to connect to a wide area network. The connection ticket can be received from the host device via the peer-to-peer wireless protocol. The connection ticket can be generated by a server system using a private key of the server system. The connection ticket may include the device identifier associated with the electronic device. A connection from an access point to the wide area network can be requested by the electronic device using a network wireless protocol. A software update of the electronic device can be performed over the wide area network via the access point. Other embodiments of this aspect include corresponding computer systems, apparatus, and computer programs recorded on one or more computer storage devices, each configured to perform the actions of the methods.

Implementations may include one or more of the following features. A method where the software update is performed after the server system verifies the device certificate. A method where performing the software update may further include: receiving a server certificate from the server system via the wireless protocol. The server certificate can be received via an access point that is in communication with the server system. The electronic device can verify the server certificate. The device certificate may be provided to the server system in response to verifying the server certificate. The device certificate may be provided via the wireless protocol. The software update of the electronic device may be provided from the server system and over the wide area network provided by the access point. A method where the device identifier is provided by the electronic device to the host device using a near-field communication (NFC) connection. A method where the software update is performed while the electronic device is inside of a sealed container. A method where requesting a connection may include verifying the connection ticket using a public key of the server and the device identifier. A method where the connection from the access point to the wide area network is requested in response to receiving the connection ticket. Implementations of the described techniques may include hardware, a method or process, or a computer tangible medium.

These and other embodiments of the disclosure are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION OF THE INVENTION

Figure 1:
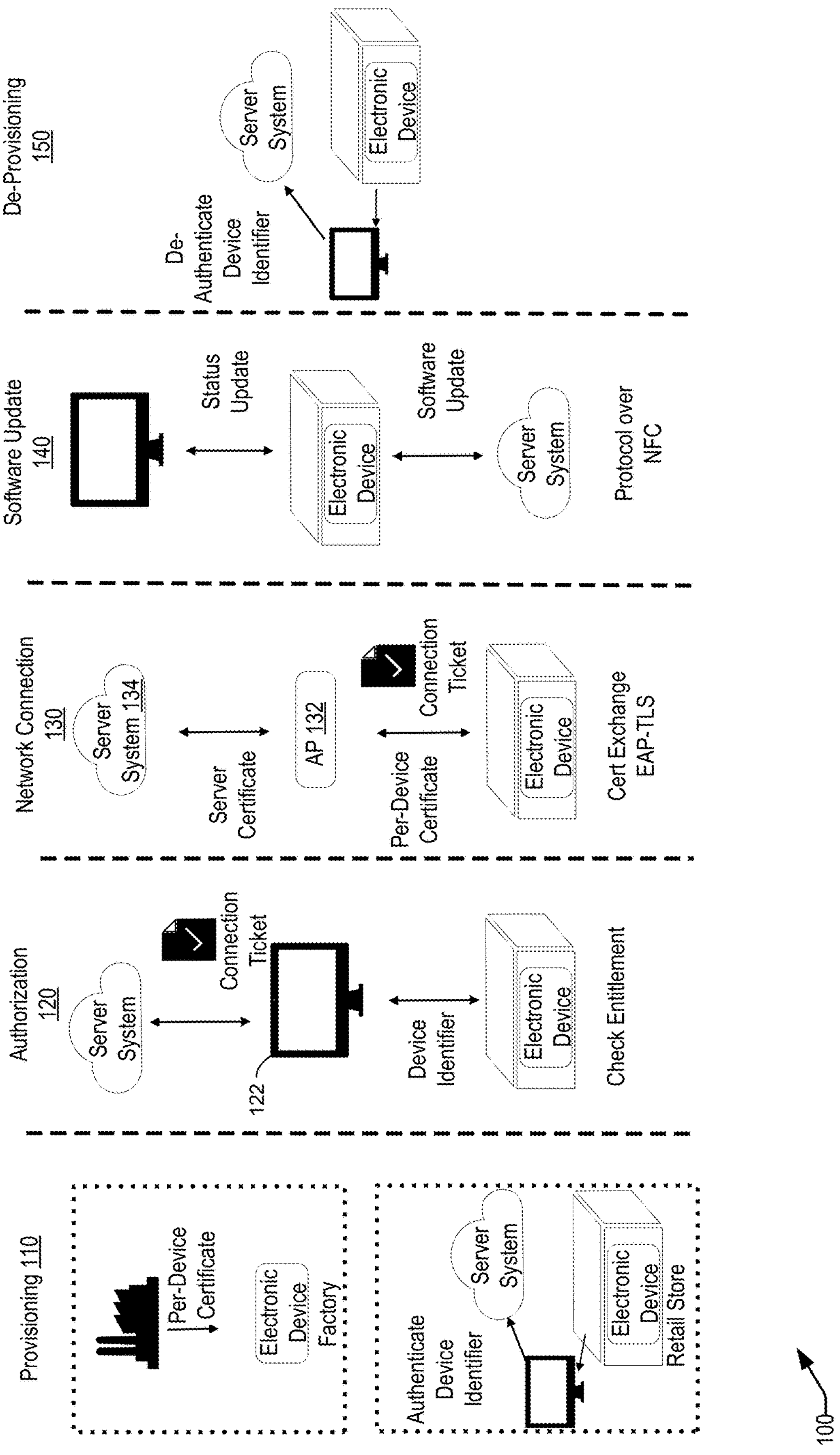
FIG. 1 is a high level diagram of an in-box update process according to an embodiment.

Certain embodiments are directed to techniques (e.g., a device, a method, a memory or non-transitory computer readable medium storing code or instructions executable by one or more processors) for performing a software update of an electronic device. The techniques can include performing an in-box software update of an electronic device. Certain operations and verifications can be performed while the device is in the box, thereby enabling security checks so that unauthorized updates are prevented.

Updating the electronic device can include provisioning an electronic device. In the provisioning stage, a per-device certificate can be added to the electronic device during manufacturing. Upon reaching the retail store, an employee can add a device identifier from the device to a server system containing an authentication list. Permissions for the electronic device can be stored in the authentication list including the permission to scan for WiFi networks. The electronic device, after the device's identifier can be added to the authentication list, can be authorized and the electronic device software can be updated.

After provisioning, the electronic device can be authorized after the device is woken up. Inside the packaging, the mobile device can be in a shelf-life mode that conserves battery. During the shelf-life mode, the electronic device may not be able to receive most wireless transmissions. In order for the electronic device to be authorized and updated, the shelf-life mode can be interrupted to wake up the device. For instance, to interrupt the shelf-life mode, and to preserve battery, the electronic device can be woken up using a power source, e.g., placed in a fixture with an inductive charging pad (e.g., inductive power source) connected to a power source. The charger can interrupt the shelf-life mode and the mobile device can communicate, via a peer-to-peer wireless protocol such as near-field communication (NFC), with a computer (e.g., host device).

After establishing communication, the host device can retrieve the electronic device's device identifier from the electronic device. The host device can send a request for authorization, containing the device identifier, to the server system containing the authorization list. If the electronic device is authorized to scan for WiFi networks, the server system can sign a device specific connection ticket using a private key. The signed connection ticket can grant permission for the particular electronic device, identified by a device identifier, to connect to a WiFi access point. The host device, after receiving the connection ticket, can provide the ticket to the electronic device via NFC.

The electronic device, with permission granted by the connection ticket, can search for and connect to a WiFi network via an access point device. The electronic device can verify the connection ticket signature using a public key. The public key can be provided to the electronic device during manufacturing. The electronic device can compare a device identifier from the ticket with the electronic device's device identifier. If the signature is verified, and the device identifier matches, the electronic device can be given permission to connect to the access point. The signed ticket may protect the electronic device from tampering via WiFi because a specific electronic device, identified by a device identifier, may only be able to connect to an approved network identified in the connection ticket. In some circumstances, the electronic device may connect to an approved network identified by a SSID is hardcoded in device software.

Once a connection is established, the server system can send a server certificate to the electronic device. The electronic device can verify the certificate using a public key. Once the electronic device has verified the server certificate, the electronic device can send the device certificate, added during the provisioning stage, to the server system. The server system can use a public key to verify that the electronic device is authenticated and approved for a software update.

After the mobile device is authenticated, the electronic device's software can be updated via WiFi according to existing procedures. During this update stage, the electronic device can periodically provide status updates to the host device using the NFC connection. Once the electronic device is updated, the electronic device can return to shelf-life mode and an employee can be notified that the update has concluded. The employee, during a de-authentication stage, can send a request to remove the electronic device from the authentication list to the server system. The electronic device can then be returned to inventory or provided to a customer.

I. Update Overview

In-box software updates of an electronic device can be initiated automatically and such updates may be done in a way to address novel security concerns. Usually, a user is informed and provides consent (e.g., via a user interface) before an electronic device connects to an access point or performs a software update. In a standard update, a user identifies and selects a network access point through a graphical user interface. Through their selection, the user assumes the risk of verifying the wireless network or performing the update. Because there is no user selection in an in-box update, techniques are presented for authenticating the communication and updates for an electronic device.

A. High-Level Diagram

FIG. 1 is a high level diagram of an in-box update process 100 according to an embodiment. The process 100 can include a provisioning phase 110 where the electronic devices is registered, and permissions are set so that the electronic device can only connect to a verified network. Provisioning phase 110 can include storing a device certificate on the electronic device; the device certificate would be different for different devices, and thus may be referred to as a per-device certificate. A device identifier associated with the electronic device can be registered in an authentication list on the server system. The host device can use an optical sensor to obtain the device identifier from a visual credential on the electronic device or the electronic device's box. The optical sensor can be a camera or a barcode reader and the visual credential can be a linear barcode or a matrix barcode. In some circumstances, the host device can use a camera and optical character recognition (OCR) to obtain an alphanumeric device identifier printed on the electronic device or the electronic device's box. As another example, the device identifier can be manually input into the host device.

In an authorization phase 120, the electronic device can be given permission to search for a wireless network. The electronic device can be woken from a low power shelf-life mode, and a host device 122 can retrieve a device identifier from the electronic device. The electronic device can be woken using a wireless charger, and the device identifier can be retrieved using a peer-to-peer wireless protocol. The host device 122 can use the device identifier to retrieve a connection ticket from the server system. The host device can provide the connection ticket to the electronic device. The connection ticket can authorize a particular electronic device to connect to a particular wireless network. The connection ticket can comprise a nonce that can be used by the electronic device to verify the ticket, an entitlement field granting permission for the electronic device to search for a network. The connection ticket may contain a configurable and dynamic or a hardcoded service set identifier (SSID) identifying a particular wireless network. The SSID may be hardcoded on the electronic device.

In a network connection phase 130, the electronic device can connect to a network through a wireless access point 132. The electronic device requests access to the access point that forwards the request to the server system 134. A server certificate can be sent to the electronic device in response to the request. The electronic device can send the device certificate, from the provisioning phase 110, in response to verifying the server certificate, e.g., using a server public key. The server system can verify the device certificate e.g., using a device public key. After both certificates are verified, the electronic device can communicate with the network through the access point.

In a software update phase 140, the electronic device's software can be updated over via the access point. The server system can provide the update to the electronic device through the wireless access point. The electronic device can periodically send status updates to the host device via the peer-to-peer protocol during the update.

When the update has concluded, the permission for the electronic device to connect to the access point can be removed in a de-provisioning phase 150. The host device can forward a request to remove the electronic device from the authentication list in the sever system. The request may include the device identifier associated with the device. The host device may forward a device identifier that was stored during the provisioning phase 110, or the host can retrieve the device identifier from a visual credential as described herein.

B. Sequence Diagram

Figure 2:
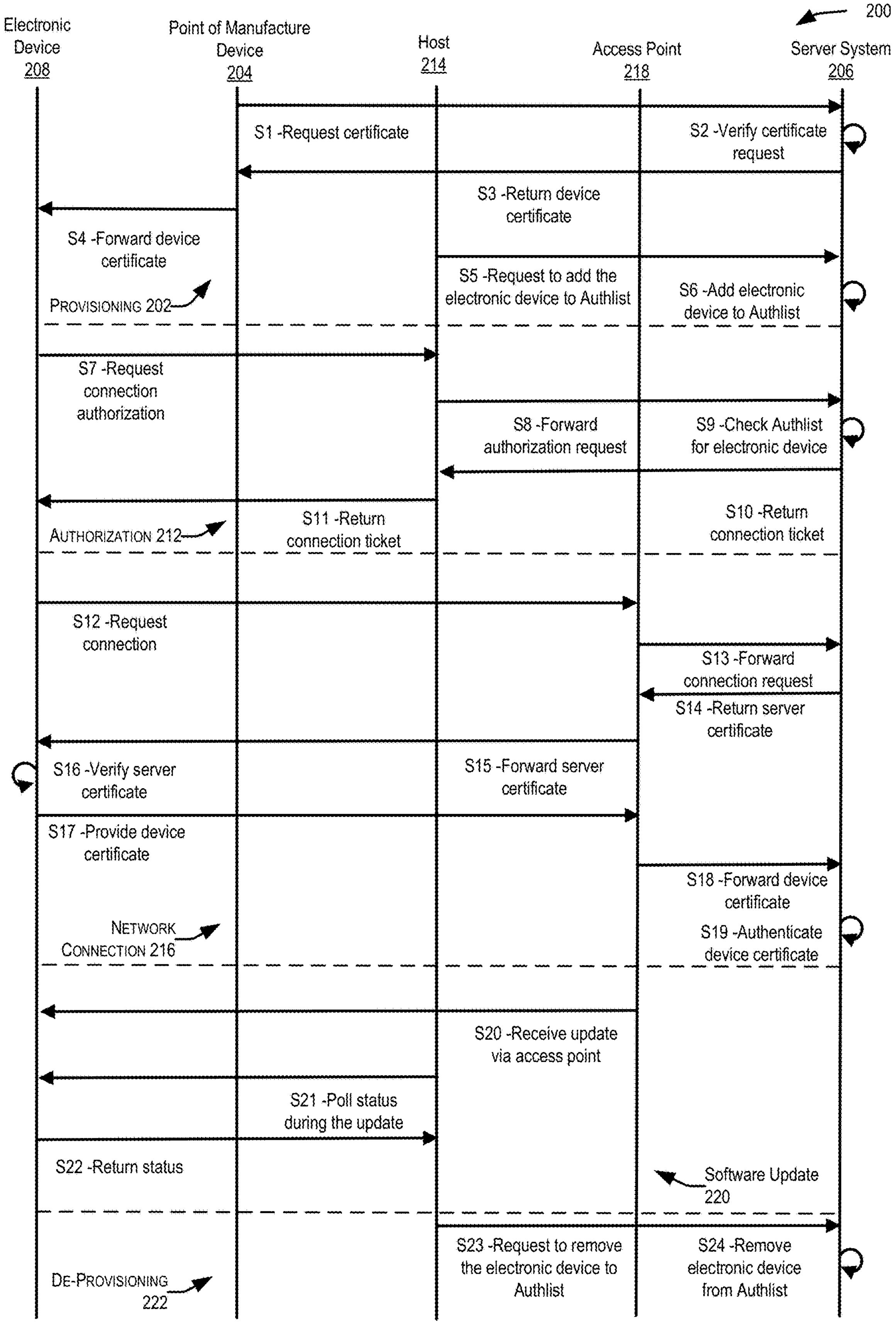
FIG. 2 is a sequence diagram of the in-box update process according to an embodiment.

FIG. 2 is a sequence diagram of the in-box update process 200 according to an embodiment. Process 200 includes the same phases as FIG. 1.

In the provisioning phase 202 at S1, a point of manufacture device 204 (e.g., a computer at the end of manufacturing line) can send a request for a device certificate to a server system 206. At S2, server system 206 verifying that the information in the request is correct.

After verifying the request at S3, the server system 206 can return a response, containing the device certificate, to the point of manufacture device 204. The device certificate can be forwarded from the point of manufacture device to the electronic device 208 at S4.

At S5, after electronic device 208 is shipped to a store but still during the provisioning phase 202, a host device 210 can send a request to authorize the electronic device 208 to the server system 206. To authorize electronic device 208 during a later phase, server system 206 can add a device identifier associated with electronic device 208 to an authorization list at S6. Such a provisioning of the device identifier allows for control over which devices can have software updated. An employee at the store can manually provide the device identifier to the host device (e.g., via a keyboard). The employee can use an optical sensor associated with the host device to scan a visual credential to obtain the device identifier. The visual credential may be a matrix barcode, linear barcode, or an alphanumeric code on the electronic device or the electronic device's box.

In the authorization phase 212 at S7, electronic device 208 can send a request for authorization to connect to an access point to a host device 214. Host device 214 can be a computing device such as a personal computer, a smartphone, a smartwatch, a tablet computer, etc.

At S8, host device 214 can forward the request for authorization to server system 206. The request can contain the device identifier associated with electronic device 208. The device identifier can be the identifier from S5 and S6. Server system 206 can check the authorization list for the device identifier at S9. If the device identifier is in the authorization list, server system 206 can send a response, containing a connection ticket, to host 214 at S10. The response, and the connection ticket, can be forwarded at S11 from host 214 to electronic device 208.

In the network connection phase 216 at S12, electronic device 208 can send a message requesting a connection to an access point 218. At S13, the message can be forwarded by access point 218 to server system 206. In response, server system 206 can return a server certificate to access point 218 at S14, and at S15 the server certificate can be forwarded to electronic device 208. After verifying the server certificate at S16, electronic device 208 can provide the device certificate from provisioning phase 202 to access point 218 at S17. At S18, the device certificate can be forwarded to server system 206. Once server system 206 authenticates the device certificate at S19, electronic device 208 is authorized to access the internet via access point 218. An electronic device that is authorized to access the internet can receive an update from server system 206.

In the software update phase 220 at S20, messages containing an update can be sent from access point 218 to electronic device 208. During the update, host device 214 can poll electronic device 208 for the status of the update at S21. Electronic device 208 can send a response to host device 214 containing the update status at S22.

In the de-provisioning phase 222 at S23, host device 214 send a request to de-authorize electronic device 208 to server system 206. To de-authorize electronic device 208, server system 206 can remove the device identifier associated with electronic device 208 from the authorization list at S24.

II. In-Box Software Update

Performing an in-box software update can be divided into phases, as described above. In a provisioning phase, a device certificate can be provided to the electronic device, and the device's unique ID can be added to an authorization list. During the authorization phase, the electronic device can receive permission to search for a wireless access point using the authorization list. The electronic device can use the device certificate to connect to a wireless access point in the network permission phase. In the software update phase, the electronic device can receive an update from the servers system using internet access provided by the access point.

After the update, the electronic device can be removed from the authorization list during the de-provisioning phase.

A. Provisioning

The provisioning phase can be divided into two steps. In the certificate step a device certificate can be added to the electronic device. In the device identifier (ID) step, a unique ID associated with the electronic device can be added to an authorization list.

1. Device Certificate

A device certificate can be used to establish a connection through a wireless access point as part of a network connection phase. In the device certificate step of the provisioning phase, a computing device at the point of manufacture can retrieve a device certificate from a server system. The certificate can be stored on the electronic device before the device is added to a box or sealed container.

Figure 3A:
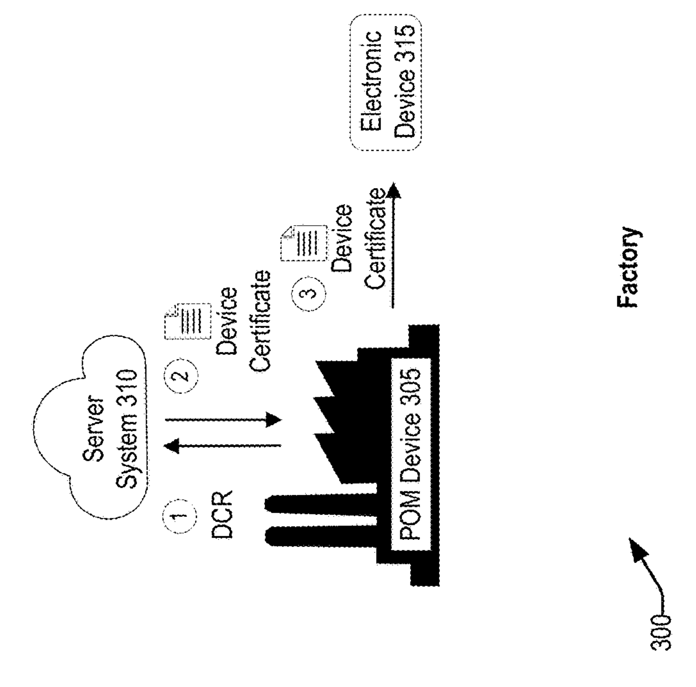
FIG. 3A is a simplified diagram of the device certificate step of the provisioning phase according to an embodiment.

FIG. 3A is a simplified diagram 300 of the device certificate step of the provisioning phase according to an embodiment. The device certificate step can occur in a manufacturing facility however other locations are contemplated. A point of manufacture (POM) device 305 can be a computing device that can communicate with a server system 310 and an electronic device 315. Server system 310 can be one or more server computers, and electronic device 315 can be a computing device configured for inductive charging.

POM device 305 can send a device certificate request (DCR) to server system 310 at step 1. The DCR can include a device identifier associated with electronic device 315. POM device 305 can retrieve the device identifier from electronic device 315. In others circumstances, an employee at the manufacturing facility can manually enter the per-device unique ID or otherwise provide the unique ID to POM device 305.

Upon receiving the DCR, server system 310 can generate a device certificate for electronic device 315 at step 2. The device certificate is a per-device certificate and the certificate can be a unique certificate for electronic device 315. For instance, the device certificate can include a public key that was created for electronic device 315, a hash of a public key, and/or a message encrypted with the public key.

At steps 2, server system 310 can forward the device certificate to POM device 305. At step 3, the certificate can be forwarded to electronic device 315. Electronic device 315 may be placed in a box or container after the device certificate is stored. Electronic device 315 can enter a low power shelf-life mode after the device certificate step.

2. Device Identifier (ID)

The device identifier can be used to authorize the electronic device to search for a wireless network. During the authorization phase, the device identifier can be used to retrieve a connection ticket from the server system. The connection ticket can then be used to establish a connection to a wireless access point.

Figure 3B:
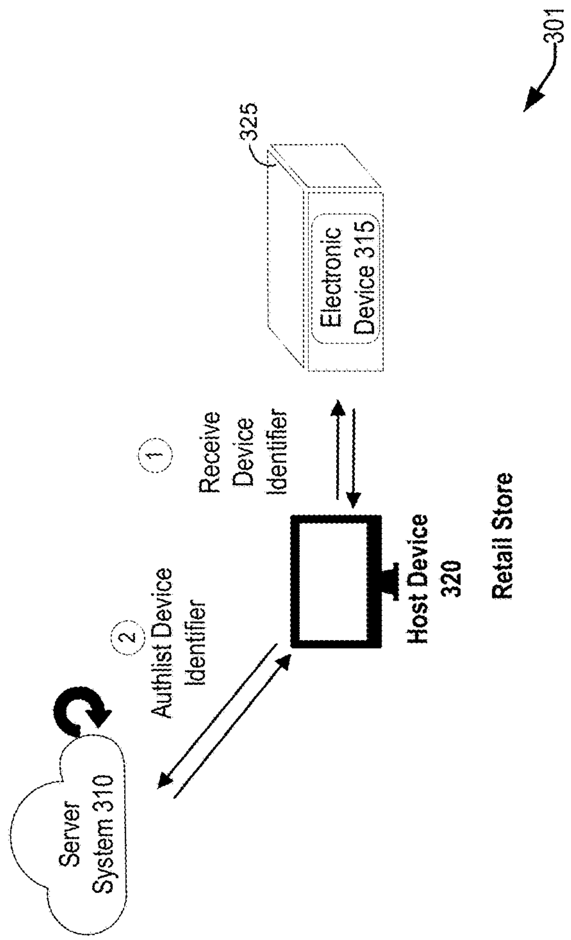
FIG. 3B is a simplified diagram of the device identifier (ID) step of the authorization phase according to an embodiment.

FIG. 3B is a simplified diagram 301 of the device identifier (ID) step of the authorization phase according to an embodiment. At step 1, a host device 320 can retrieve a device identifier from electronic device 315. Host device 320 can be a computing device such as a personal computer, a smartphone, a tablet device, a smartwatch, etc. An employee may manually input the device identifier into host device 320. The employee can read the device identifier from the electronic device, the electronic device's box, an inventory list, a delivery receipt, etc. The device identifier can be written as an alphanumeric code, a linear barcode, a matrix barcode, etc. An optical sensor associated with host device 320 can be used to read the device identifier from electronic device, the electronic device's box, an inventory list, a delivery receipt, etc. The device identifier may be provided while electronic device 315 is in a box 325 such as tamper proof product packaging.

At step 2, host device 320 can forward the device identifier to server system 310 via a network such as the Internet. Server system 310 can add the device identifier to an authorization list. Entries in the authorization list may be removed during the de-provisioning phase. In some circumstances, entries may be added to the authorization list and automatically removed after a fixed period of time (e.g., 1 hour, 12 hours, 1 day, 2 days, 3 days, 4 days, 5 days, 1 week, etc.). Server system 310 may send a message to host device 320 confirming that the device identifier associated with electronic device 315 was added to the authorization list. Electronic device 315 may be in a low power shelf-life mode during the unique ID step.

B. Authorization

In the authorization step, the electronic device can receive an entitlement to scan for a wireless network for use in performing a software update. The electronic device, in a box, can be woken from the shelf-life mode, e.g., by a wireless charger. After being woken, the electronic device can present the device identifier, and receive a connection ticket, from the server system.

Figure 4:
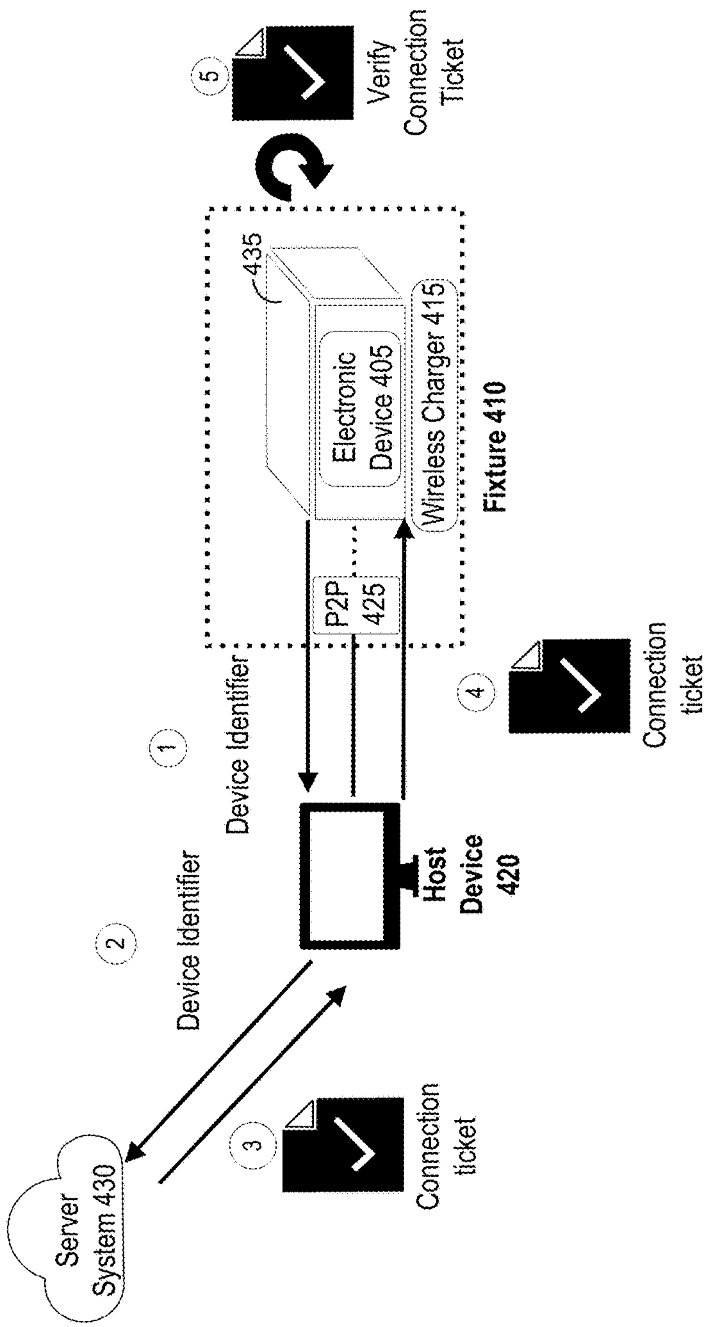
FIG. 4 is a simplified diagram 400 of the authorization step according to an embodiment.

FIG. 4 is a simplified diagram 400 of the authorization step according to an embodiment. The electronic device 405 can be placed in a fixture 410 while electronic device 405 is in a shelf-life mode. The fixture can be a frame that can accommodate electronic device 405. A wireless charger 415 in fixture 410 can wake electronic device 405 from the shelf-life mode. Wireless charger 415 can wake electronic device 405 by wirelessly providing power to electronic device 405 while the device is inside a box 435. The box can be tamper proof retail packaging.

Wireless charger 415 may be configured to provide power over a sufficiently long distance that electronic device 405 can be woken without removing electronic device 405 from the box. The wireless charger can be configured to charge an electronic device with a distance between the inductive charger and the electronic device of 1 millimeter (mm), 2 mm, 3 mm, 4 mm, 5 mm, 10 mm, 20 mm, 30 mm, 40 mm, 50 mm, etc. In some circumstances, electronic device 405 can be woken through alternative means such as a predetermined gesture that is sensed by an accelerometer or other sensor in electronic device 405.

After leaving the shelf-life mode, electronic device can communicate with a host device 420 via a peer-to-peer (P2P) access point 425. Various communication protocols can be used with the P2P access point 425 including near field communication (NFC) protocols, Bluetooth, offshore wideband protocols, peer-to-peer Wi-Fi, etc. At step 1, electronic device 405 can present a device identifier (ID) associated with electronic device 405 to host device 420 via P2P access point 425. At step 2, host device 420 can forward the unique ID to server system 430 via a network connection.

Server system 430 can contain the authorization list from the unique ID step. Server system 430 can check the unique ID received from host device 420 against the entries in the authorization list. If the unique ID is in the authorization list, server system 430 can generate a connection ticket and send the ticket to electronic device 405 at step 3. At step 4, host device 420 can forward the connection ticket to electronic device 405. At step 5, electronic device 405 can verify the connection ticket. The connection ticket can be a message that was signed with a private key. Signing a connection ticket can mean appending a signature, or a value calculated using a private key (e.g., Rivest-Shamir-Adleman public-key), to a message containing the device identifier to produce a connection ticket. It should be computationally infeasible to generate the proximity message's signature without the private key and the signature should be able to be verified using a public key associated with the private key. In some situations, the signature can be generated for a timestamp so that the time the connection ticket was generated can be verified. In one example, a public key-private key pair can be created by generating a key pair containing a modulus, N, that is the product of two random secret distinct large primes, along with integers, e and d, such that $e\,d \equiv 1 \ (\mathrm{mod}\ \phi\ (N))$, where $\varphi$ is Euler's totient function.

In this example, the public key can consist of N and e, and the private key can contain d. Signing the message can include computing a signature, $\sigma$, such that $\sigma \equiv md \ (\mathrm{mod}\ N)$, where md is a modular exponentiation operation. To verify, the receiver checks that $\sigma e \equiv m$ The connection ticket can contain permission for electronic device 405 to search for a wireless network. The permission can identify electronic device 405 using a device identifier associated with electronic device 405. The received device identifier from the permission can be compared against the electronic device's device identifier to verify the connection ticket if the two identifiers match. When server system 430 creates the connection ticket, the server can sign the permission using a private key. The permission may identify a wireless network by a network identifier (ID). For instance, the network may be a WiFi network and the network ID may be a service set identifier (SSID) identifying a particular access point. The public key corresponding to the private key can be stored on electronic device 405 during manufacturing or during the provisioning phase. For example, the public key can be provided to the electronic device 405 with the operating system during manufacturing.

C. Establishing a Network Connection

In the network connection phase, the electronic device can establish a secure connection to the server system. The connection can be established through a wireless access point after the server and electronic device exchange and authenticate certificates.

Figure 5:
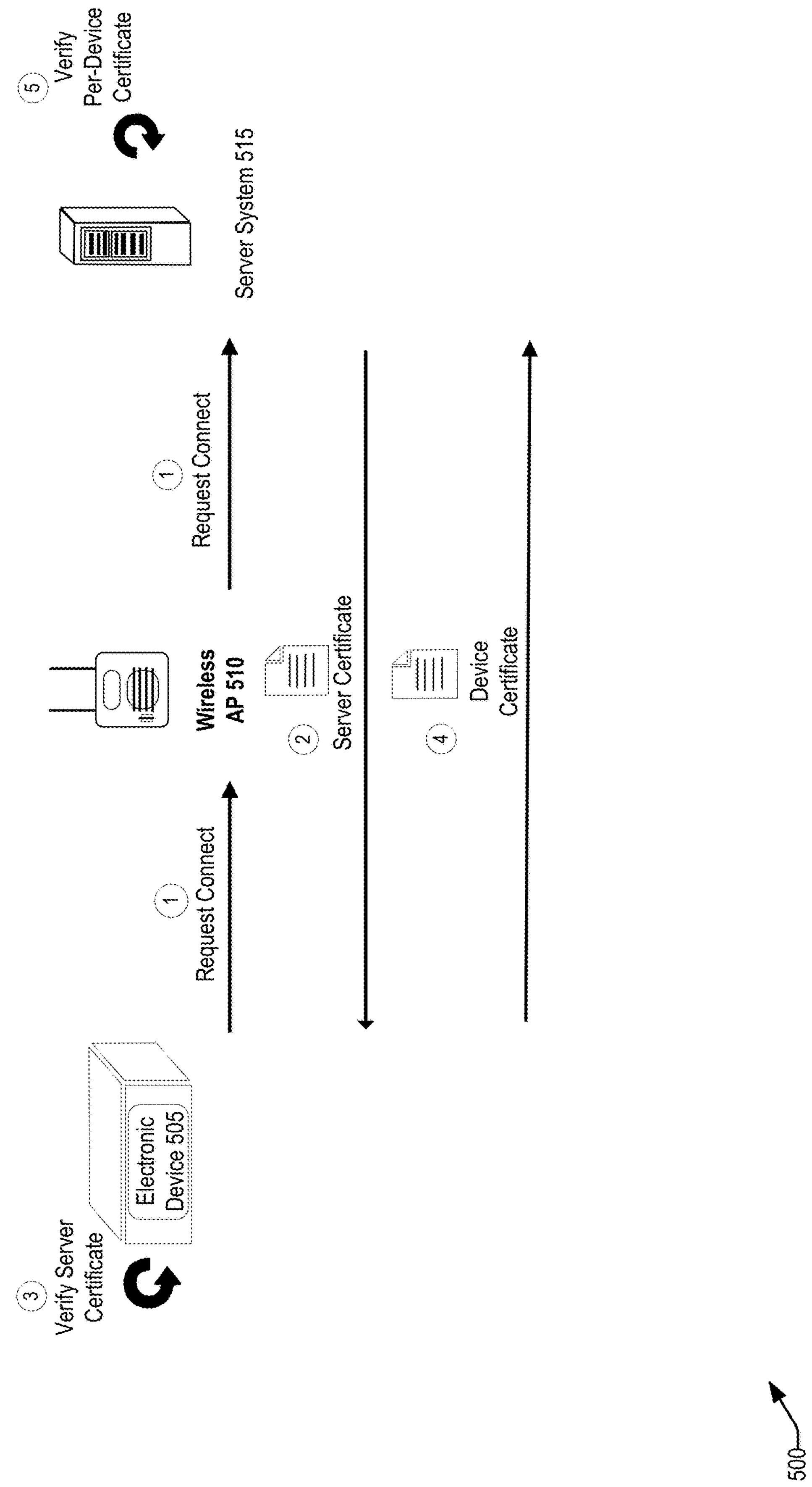
FIG. 5 is a simplified diagram of the network connection phase according to an embodiment.

FIG. 5 is a simplified diagram 500 of the network connection phase according to an embodiment. In step 1, electronic device 505 can request a connection to a wide area network from a wireless access point (AP) 510 and the request can be forwarded to server system 515. The request can be a message notifying server system 515 of attempt to connect to the server system. The request can identify an address and instruct the server system 515 to send the server certificate to the address. Electronic device 505 may use a network identifier, hardcoded to the device or provided via the connection ticket in the authorization step, to identify and connect to the wireless network broadcast by AP 510. For instance, the connection ticket can contain a SSID associated with AP 510 that electronic device 505 can use to identify and connect to AP 510. Upon receiving the request, server system 515 can forward a server certificate to electronic device 505 via AP 510 in step 2.

The server certificate can be a message signed with a private key associated with server system 515. The server certificate can be signed by a private key maintained by a certificate authority. Thus, server certificate can include the message and signature. At step 3, electronic device 505 can verify the server certificate by verifying the signature, e.g., by decrypting the signature with a public key associated with server system 515. In some circumstances, electronic device 505 can send a message to server system 515. The message can be encrypted by server system 515 and returned to the electronic device 505 as the server certificate. This server public key can already be stored (e.g., with the operating system) on electronic device 505 or the key could be provided to electronic device 505 during the provisioning phase.

Upon verifying the server certificate, electronic device 505 can forward the device certificate to server system 515 via AP 510 at step 4. The device certificate can be a message signed with a public key associated with server system 515. The message could be signed with a private key of the certificate, associated with the device, that is obtained during provisioning. The public key, or a message encrypted with the public key, can be provided to the electronic device 505 in the provisioning phase. Electronic device 505 can sign the device certificate with the private key before the message is transmitted. At step 5, server system 515 can verify the device certificate using the public key associated with the private key. The public key can be provided to server system 515 during provisioning. After the server certificate and the device certificate has been verified, electronic device 505 can communicate with a network, such as the Internet, via AP 510. The device certificate or the server certificate can be verified with any appropriate authentication protocol.

D. Software Update

Software for the electronic device can be updated over a wide area network while the device is in a box or product packaging. Progress for the update cannot be shown on the electronic device's display so status updates can be provided to a host device using a point to point wireless protocol.

Figure 6:
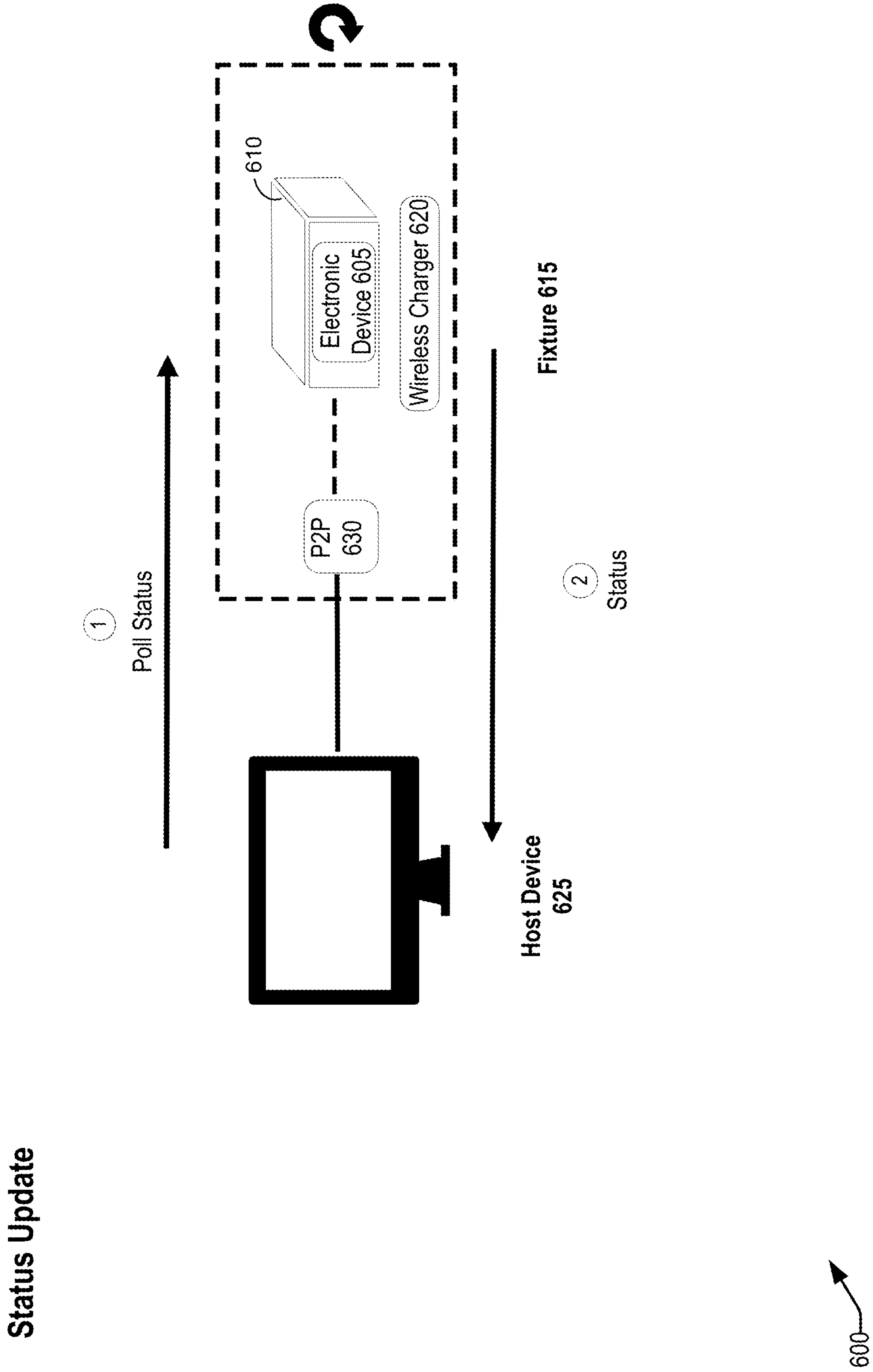
FIG. 6 shows a simplified diagram of a software update phase according to an embodiment.

FIG. 6 shows a simplified diagram 600 of a software update phase according to an embodiment. The electronic device 605, and the box 610 containing the device, can be inside of the fixture 615 during the update. A wireless charger 620 can charge electronic device 605 while it receives the update via the wide area network generated by an AP (e.g., AP 510). During the update, electronic device 605 can periodically provide status updates to host device 625 via peer-to-peer (P2P) access point 630. The progress can be displayed on host device 625 so that an employee can monitor the update progress.

The software update can be a change to the software of electronic device 605. The software update can include new or different versions of the operating system, firmware, or application software for electronic device 605. The software update can be used to personalize electronic device 605 and the update can include changes to the contact information, settings, background picture, applications, or layout of electronic device 605.

E. De-Provisioning the Updated Device

The device identifier associated with the electronic device can be removed from the authorization list during the de-provisioning phase. If the device identifier was not removed from the authorization list, the electronic device could potentially be updated, or configured, without permission from the electronic device's user.

Figure 7:
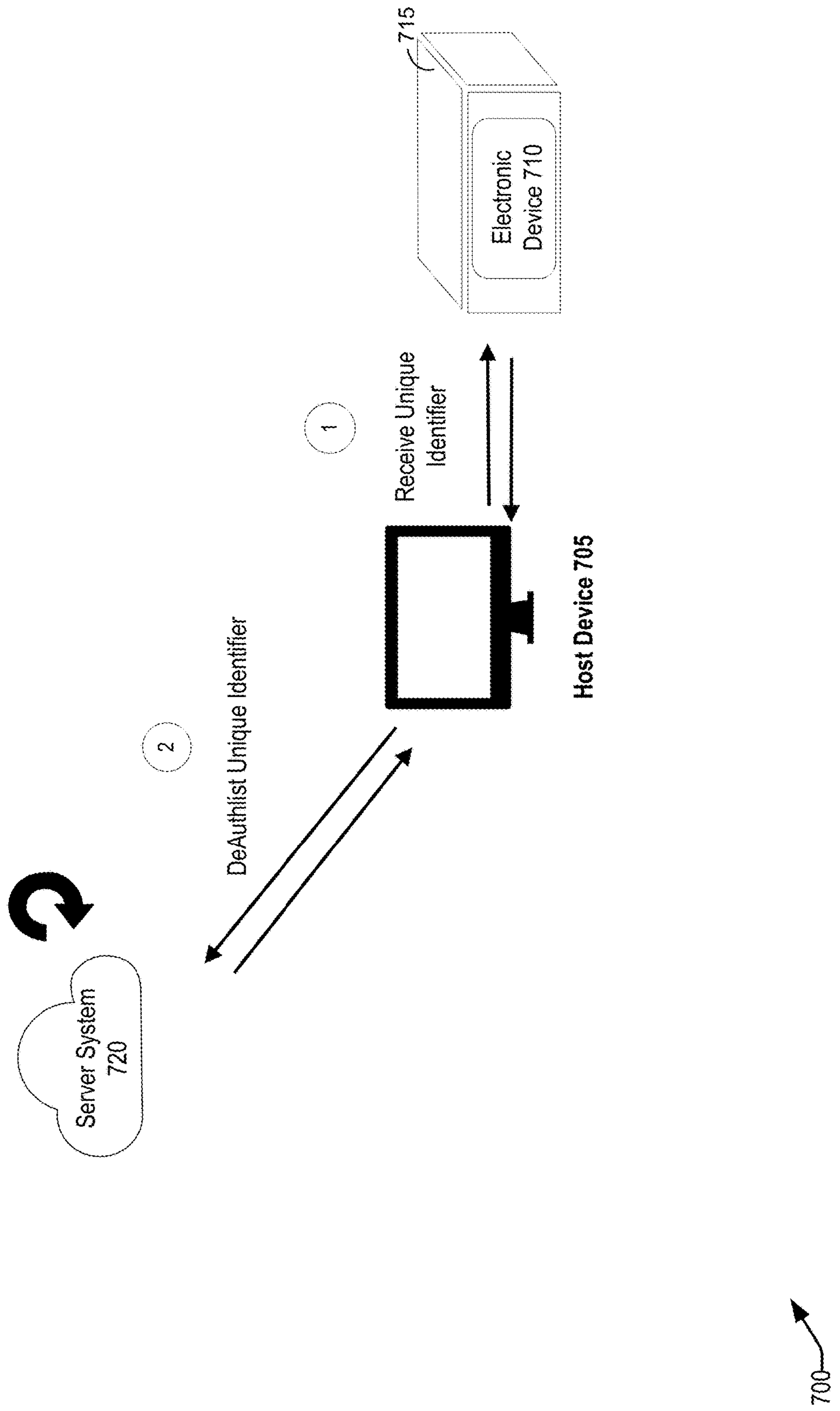
FIG. 7 shows a simplified diagram of the de-provisioning phase according to an embodiment.

FIG. 7 shows a simplified diagram of the de-provisioning phase according to an embodiment. After a connection to the wide area network has been established, or after the software update has been performed, the host device 705 can retrieve the device identifier from the electronic device 710. The device identifier can be retrieved from electronic device 710 via a peer-to-peer access point or a wireless access point. In some circumstances, an employee can provide the device identifier to host device 705 by scanning a barcode, linear barcode, matrix barcode, quick response (QR) code, or another visual credential on the box 715. In some instances, the employee may manually enter the device identifier into host device 705.

Host device 705 can forward the device identifier to server system 720 via a network such as the Internet. The device identifier can be forwarded as part of a request to remove the device identifier from the authorization list. In some instances, the device identifier can be forwarded without a request and server system 720 can check the authorization list to determine if the received device identifier is in the authorization list. If server system 720 receives a device identifier that is already in the authorization list, server system 720 may remove the device identifier from the authorization list.

III. Method Flow

Figure 8:
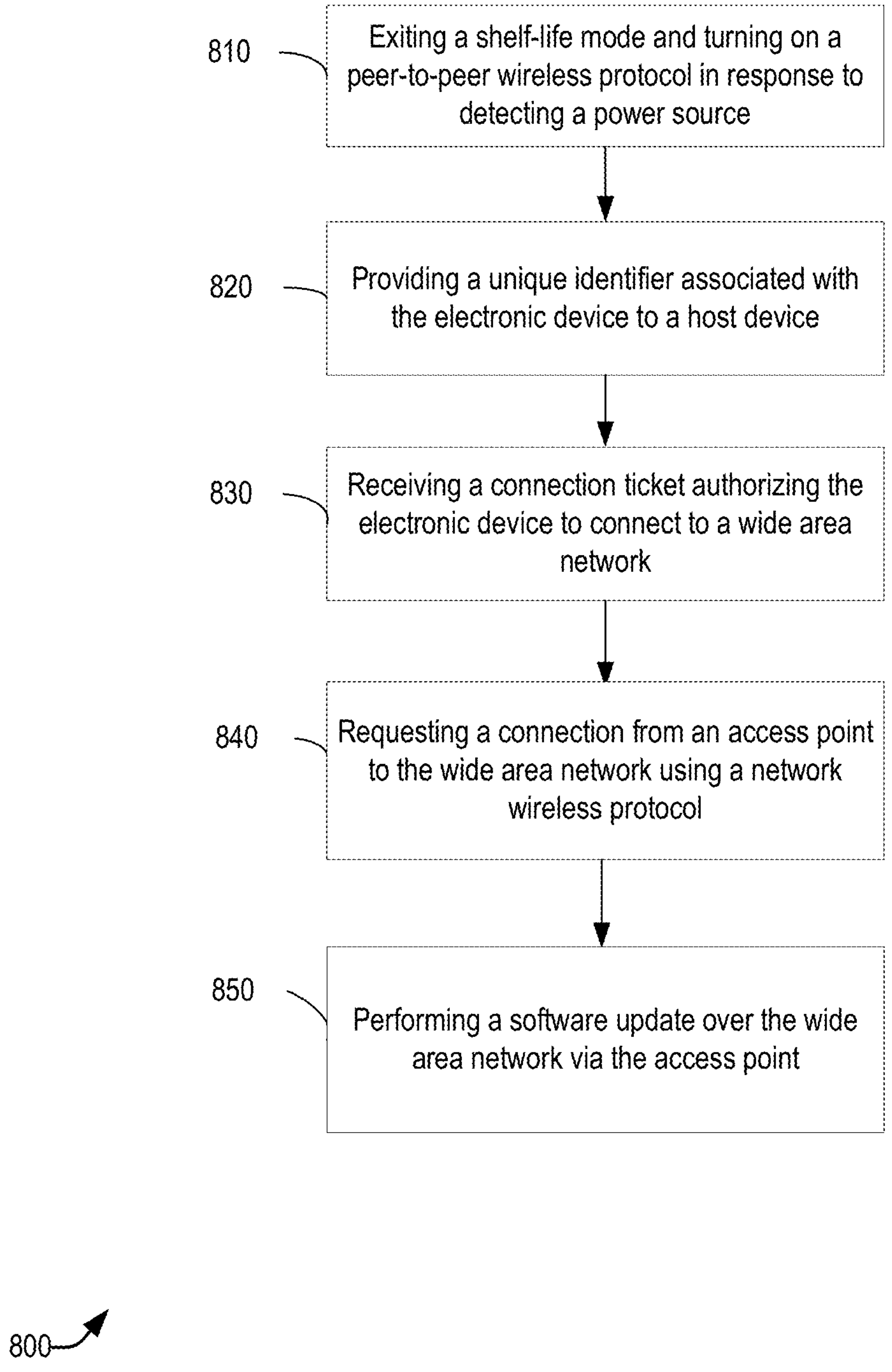
FIG. 8 is a flowchart illustrating a method for performing an in-box software update of an electronic device.

FIG. 8 is a flowchart illustrating a method 800 for performing an in-box software update of an electronic device. In some implementations, one or more method blocks of FIG. 8 may be performed by an electronic device (e.g.,). In some implementations, one or more method blocks of FIG. 8 may be performed by another device or a group of devices separate from or including the electronic device. Additionally, or alternatively, one or more method blocks of FIG. 8 may be performed by one or more components of electronic device (e.g.,), such as always-on processor (AOP) 930, application processor 940, processor 1018, computer readable medium 1002, input/output (I/O) subsystem 1006, ultra-wideband (UWB) circuitry 1515, BT/WiFi circuitry 925, NFC circuitry 935, inductive charging circuitry 915, wireless circuitry 1008, etc.

At block 810, the electronic device can exit the shelf-life mode and turn on a peer-to-peer wireless protocol in response to detecting a power source. The electronic device (e.g., electronic device 405) can be a computing device with an inductive charging coil. The electronic device can be a mobile device, a smartphone, a smartwatch, a tablet device, a laptop computer, a desktop computer, etc. The power source may be a wireless power source such as an inductive charger (e.g., wireless charger 415). The wireless charger can be configured to charge an electronic device through a box (e.g., box 435) with a distance between the inductive charger and the electronic device of 1 millimeter (mm), 2 mm, 3 mm, 4 mm, 5 mm, 10 mm, 20 mm, 30 mm, mm, 50 mm, etc. The peer-to-peer wireless protocol can be a near field communication (NFC) protocol, Bluetooth, offshore wideband protocols, peer-to-peer Wi-Fi, etc.

At block 820, a device identifier (ID) associated with the electronic device can be provided to a host device via the peer-to peer wireless protocol. The unique ID can be provided using a near field communication (NFC) protocol. The electronic device (e.g., electronic device 405) can provide the unique ID to a server system (e.g., server system 430) via a peer-to-peer access point (e.g., P2P 425) and a host device (e.g., host device 420).

At block 830, the electronic device can receive a connection ticket authorizing the electronic device to connect to a wide area network. The connection ticket can be received via the host device (e.g., host device 420) and the peer-to-peer access point (e.g., P2P 425) using the peer-to-peer wireless protocol. The connection ticket can be generated by a server system using a private key. The connection ticket can include a field with the device identifier provided at block 820, a field granting permission for the electronic device to search for a wireless network, a field with a network identifier, or a field granting permission for the electronic device to perform a software update.

The connection ticket can be signed using a private key associated with the server system (e.g., server system 430). Some or all of the connection ticket may be signed and the ticket can include the signature. In some circumstances other data can be signed using the private key, and, for instance, the device ID can be signed using the key. The connection ticket can be verified using a public key of the server (e.g., a public key associated with server system 430) and the unique ID (e.g., a unique ID associated with electronic device 405).

At block 840, the electronic device can request a connection to a wide area network. The connection can be requested from the server system (e.g., server system 515) via an access point (e.g., access point (AP) 510). The access point can be a wireless access point that is part of the wide area network. The access point can send and receive messages using a wireless protocol such as WiFi. The connection can be requested in response to receiving the connection ticket in 830. The electronic device can verify a server certificate received from the server system. The electronic device can forward a device certificate to the server system, and a connection can be established after the device certificate is verified by the server system. The connection can be requested by the electronic device in response to receiving the connection ticket.

At block 850, the software update can be performed over the wide area network via the access point. The electronic device (e.g., electronic device 605) can receive the update from the access point (e.g., AP 510) while the device is inside of a fixture (e.g., fixture 615). The software update can be performed while the electronic device is inside of a sealed container (e.g., box 610). The electronic device can be charged by a wireless charger (e.g., wireless charger 620) during the update. The electronic device can provide updates on the status of the update to a host device (e.g., host device 625) via a peer-to-peer access point (e.g., P2P 630). The update can be performed after the server system verifies the device certificate. After the device certificate is verified, the electronic device can be authenticated for wide area network access. The device certificate may a message encrypted with a private key and the certificate can be verified by decrypting the message with a private key. The device certificate may be used to encrypt a message with a private key and the certificate can be verified by decrypting the message with a public key.

The software update can be performed after a server certificate is verified. The electronic device can access the wide area network, and receive the update, after the certificate is verified. The server certificate can be received from the server system (e.g., server system 515) by the electronic device (e.g., electronic device 505) via a wireless access point (e.g., AP 510). The electronic device can verify the server certificate using a public key associated with the server system. The electronic device can provide the device certificate to the server system in response to verifying the server certificate. The server system can verify the device certificate using a public key associated with the electronic device. After the certificates are verified, the electronic device can perform a software update.

Method 800 may include additional implementations, such as any single implementation or any combination of implementations described below and/or in connection with one or more other processes described elsewhere herein.

Although FIG. 800 shows example blocks of method 800, in some implementations, method 800 may include additional blocks, fewer blocks, different blocks, or differently arranged blocks than those depicted in FIG. 8. Additionally, or alternatively, two or more of the blocks of method 800 may be performed in parallel.

IV. Electronic Device for Performing an Update

Figure 9:
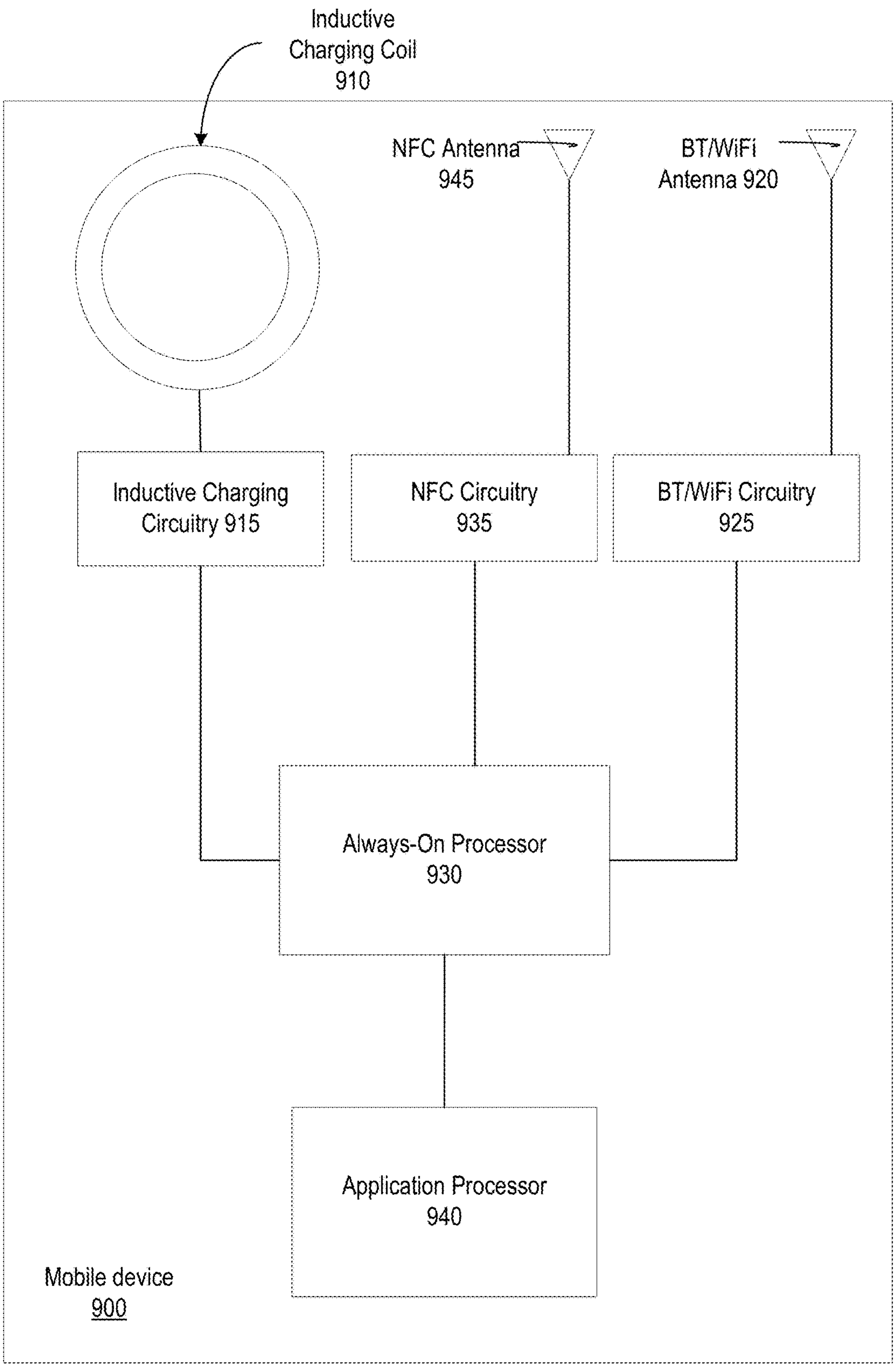
FIG. 9 is a block diagram of components of an electronic device operable to perform an in-box software update according to an embodiment.

FIG. 9 is a block diagram of components of an electronic device 900 operable to perform an in-box software update according to an embodiment. Electronic device 900 includes an inductive charging coil and antennas for at least two different wireless protocols, as described above. The first wireless protocol (e.g., NFC) may be used for authentication and exchanging status updates. The second wireless protocol (e.g., WiFi) may be used for performing a software update.

As shown, electronic device 900 includes an inductive charging coil 910 for performing wireless charging. Inductive charging coil 910 is connected to inductive charging circuitry 915 for analyzing current received from inductive charging coil 910. Inductive charging circuitry 915 can communicate with an always-on processor (AOP) 930, which can perform further processing using information about current received via inductive charging coil 910. For example, AOP 930 can wake the electronic device from a shelf-life mode in response to a current received via inductive charging coil 910. AOP 930 and other circuits of the device can include dedicated circuitry and/or configurable circuitry, e.g., via firmware or other software.

As shown, electronic device 900 also includes Bluetooth (BT)/Wi-Fi antenna 920 for communicating data with other devices including a host device or an access point. BT/Wi-Fi antenna 920 is connected to BT/Wi-Fi circuitry 925 for analyzing detected messages from BT/Wi-Fi antenna 920.

As shown, electronic device 900 also includes NFC antenna 945 for communicating data with other devices including a host device or an access point. NFC antenna 945 is connected to NFC circuitry 935 for analyzing detected messages from NFC antenna 945.

In other embodiments, inductive charging circuitry 915, BT/Wi-Fi circuitry 925, and NFC circuitry 935 can alternatively or in addition be connected to application processor 940, which can perform similar functionality as AOP 930. Application processor 940 typically requires more power than AOP 930, and thus power can be saved by AOP 930 handling certain functionality, so that application processor 940 can remain in a sleep state, e.g., an off state. For example, application processor 940 may remain in a sleep state during shelf-life mode.

V. Example Device

A system of one or more electronic devices can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Figure 10:
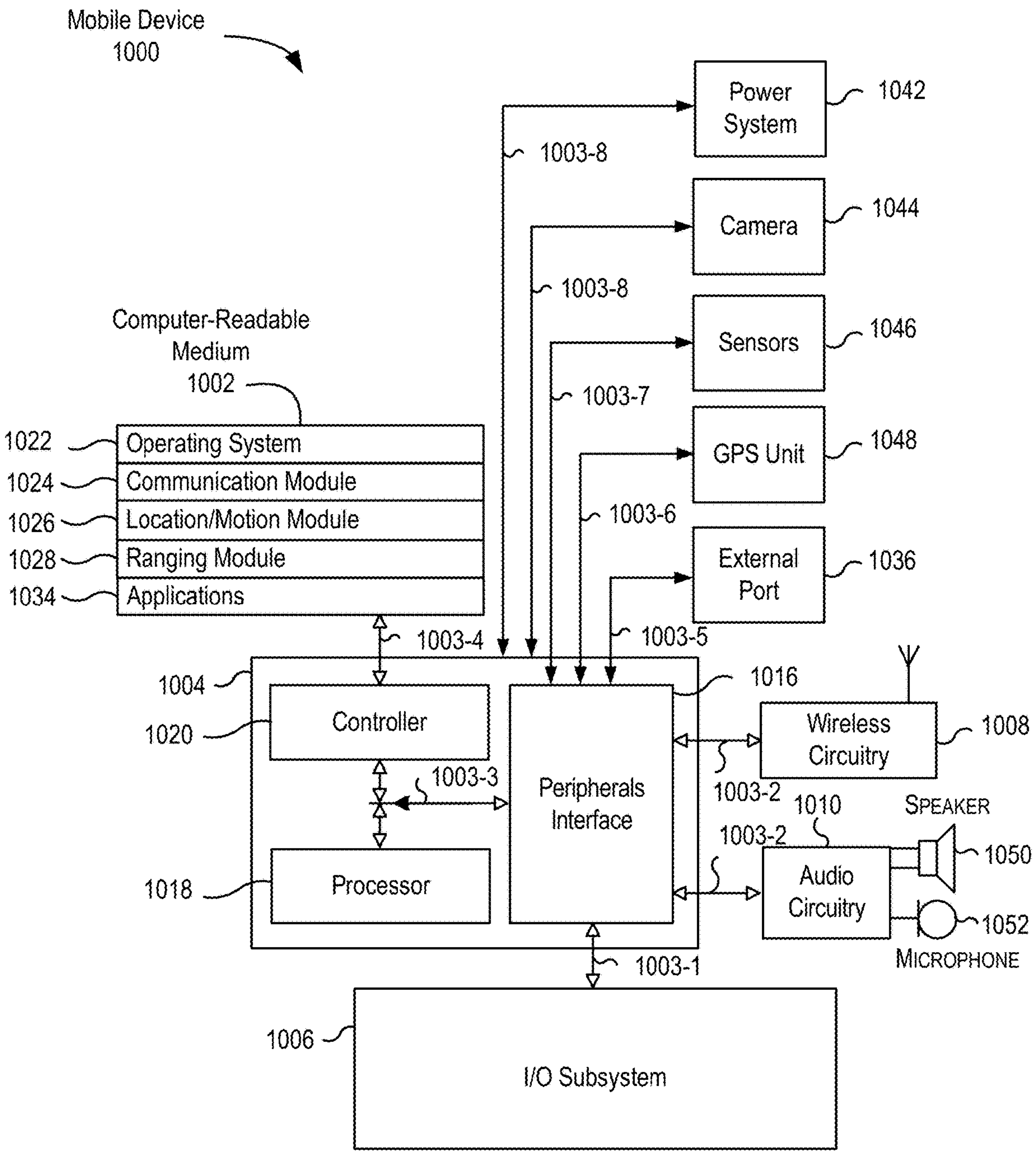
FIG. 10 is a block diagram of an example electronic device according to an embodiment.

FIG. 10 is a block diagram of an example electronic device 1000 according to an embodiment. Device 1000 generally includes computer-readable medium 1002, a processing system 1004, an Input/Output (I/O) subsystem 1006, wireless circuitry 1008, and audio circuitry 1010 including speaker 1012 and microphone 1014. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 1008 can use various protocols, e.g., as described herein. In various embodiments, wireless circuitry 1008 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1008 is coupled to processing system 1004 via peripherals interface 1016. Peripherals interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 1016 couple the input and output peripherals of device 1000 to the one or more processors 1018 and computer-readable medium 1002. One or more processors 1018 communicate with computer-readable medium 1002 via a controller 1020. Computer-readable medium 1002 can be any device or medium that can store code and/or data for use by one or more processors 1018. Computer-readable medium 1002 can include a memory hierarchy, including cache, main memory and secondary memory. The memory hierarchy can be implemented using any combination of random access memory (RAM) (e.g., static random access memory (SRAM,) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 1016, one or more processors 1018, and controller 1020 can be implemented on a single chip, such as processing system 1004. In some other embodiments, they can be implemented on separate chips.

Processor(s) 1018 can include hardware and/or software elements that perform one or more processing functions, such as mathematical operations, logical operations, data manipulation operations, data transfer operations, controlling the reception of user input, controlling output of information to users, or the like. Processor(s) 1018 can be embodied as one or more hardware processors, microprocessors, microcontrollers, field programmable gate arrays (FPGAs), application-specified integrated circuits (ASICs), or the like.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors can include accelerometers, compass, gyrometer, pressure sensors, audio sensors, light sensors, barometers, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module 1024 (or set of instructions), a location module 1026 (or set of instructions), a ranging module 1028 that is used as part of ranging operation described herein, and other application programs 1034 (or set of instructions).

Operating system 1022 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1026 can assist in determining the current position (e.g., coordinates or other geographic location identifiers) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data Ranging module 1028 can send/receive ranging messages to/from an antenna, e.g., connected to wireless circuitry 1008. The messages can be used for various purposes, e.g., to identify a sending antenna of a device, determine timestamps of messages to determine a distance of mobile device 1000 from another device. Ranging module 1028 can exist on various processors of the device, e.g., an always-on processor (AOP), a UWB chip, and/or an application processor. For example, parts of ranging module 1028 can determine a distance on an AOP, and another part of the ranging module can interact with a sharing module, e.g., to display a position of the other device on a screen in order for a user to select the other device to share a data item. Ranging module 1028 can also interact with a reminder module that can provide an alert based on a distance from another mobile device.

The one or more applications 1034 on device 1000 can include any applications installed on the device 1000, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1006 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or trackpad. In some embodiments, I/O subsystem 1006 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1006 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to “opt in” or “opt out” of participation in the collection of personal information data during registration for services or anytime thereafter. In addition to providing “opt in” and “opt out” options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. The phrase “based on” should be understood to be open-ended, and not limiting in any way, and is intended to be interpreted or otherwise read as “based at least in part on,” where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of “or” is intended to mean an “inclusive or,” and not an “exclusive or” unless specifically indicated to the contrary. Reference to a “first” component does not necessarily require that a second component be provided. Moreover reference to a “first” or a “second” component does not limit the referenced component to a particular location unless expressly stated. The term “based on” is intended to mean “based at least in part on.”

Disjunctive language such as the phrase “at least one of X, Y, or Z,” unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by an electronic device comprising:

exiting a shelf-life mode and turning on a peer-to-peer wireless protocol in response to detecting a power source; providing a device identifier of the electronic device to a host device, the device identifier previously provisioned to a server system;

receiving, via the peer-to-peer wireless protocol from the host device, a connection ticket authorizing the electronic device to connect to a wide area network, the connection ticket being generated by the server system using a private key of the server system, wherein the connection ticket comprises the device identifier of the electronic device as determined from the server system, and a network identifier that is associated with the wide area network;

verifying, by the electronic device, the connection ticket by comparing the device identifier stored in the electronic device with the device identifier of the electronic device in the connection ticket;

connecting, responsive to verifying the connection ticket, to the wide area network identified by the connection ticket using a network wireless protocol;

receiving, via the network wireless protocol, a server certificate from the server system, the server certificate received via the wide area network;

providing, via the wide area network, a device certificate to the server system in response to verifying the server certificate; and performing a software update over the wide area network while the electronic device is inside a container.

2. The method of claim 1, wherein the connection ticket includes a message and a signature of the message, the signature generated using the private key of the server system, wherein verifying the connection ticket comprises:

verifying the signature using the message and a public key that corresponds to the private key of the server system.

3. The method of claim 1, wherein the connection to the wide area network is requested in response to receiving the connection ticket.

4. The method of claim 1, wherein the device identifier is provisioned to an authentication list of the server system prior to the electronic device exiting the shelf-life mode.

5. The method of claim 1, wherein the software update is performed after the server system verifies a device certificate.

6. The method of claim 5, wherein after performing the software update, the device identifier is removed from an authentication list at the server system.

7. The method of claim 1, wherein the peer-to-peer wireless protocol is near-field communication (NFC).

8. The method of claim 1, wherein the power source is an inductive power source.

9. The method of claim 1, wherein the device certificate identifier is provided to the electronic device by a point of manufacture (POM) device.

10. A non-transitory computer-readable medium storing a plurality of instructions that, when executed by one or more processors of an electronic device, cause the one or more processors to perform operations comprising:

exiting a shelf-life mode and turning on a peer-to-peer wireless protocol in response to detecting a power source; providing a device identifier of the electronic device to a host device, the device identifier previously provisioned to a server system;

receiving, via the peer-to-peer wireless protocol from the host device, a connection ticket authorizing the electronic device to connect to a wide area network, the connection ticket being generated by the server system using a private key of the server system, wherein the connection ticket comprises the device identifier of the electronic device as determined from the server system, and a network identifier that is associated with the wide area network;

verifying the connection ticket by comparing the device identifier stored in the electronic device with the device identifier of the electronic device in the connection ticket;

connecting, responsive to verifying the connection ticket, to the wide area network identified by the connection ticket using a network wireless protocol;

receiving, via the network wireless protocol, a server certificate from the server system, the server certificate received via the wide area network;

providing, via the wide area network, a device certificate to the server system in response to verifying the server certificate; and performing a software update over the wide area network while the electronic device is inside a container.

11. The non-transitory computer-readable medium of claim 10, wherein the device identifier is provisioned to an authentication list of the server system prior to the electronic device exiting the shelf-life mode.

12. The non-transitory computer-readable medium of claim 10, wherein verifying the connection ticket comprises:

wherein the connection ticket includes a message and a signature of the message, the signature generated using the private key of the server system, wherein verifying the connection ticket comprises:

verifying the signature using the message and a public key that corresponds to the private key.

13. A system, comprising:

a memory configured to store a plurality of instructions; and one or more processors configured to access the memory, and to execute the plurality of instructions to cause an electronic device to:

exit a shelf-life mode and turning on a peer-to-peer wireless protocol in response to detecting a power source;

provide a device identifier of the electronic device to a host device, the device identifier previously provisioned to a server system;

receive, via the peer-to-peer wireless protocol from the host device, a connection ticket authorizing the electronic device to connect to a wide area network, the connection ticket being generated by the server system using a private key of the server system, wherein the connection ticket comprises the device identifier of the electronic device as determined from the server system, and a network identifier that is associated with the wide area network;

verify the connection ticket by comparing the device identifier stored in the electronic device with the device identifier of the electronic device in the connection ticket;

connect, responsive to verifying the connection ticket, the wide area network identified by the connection ticket using a network wireless protocol;

receive, via the network wireless protocol, a server certificate from the server system, the server certificate received via the wide area network;

provide, via the wide area network, a device certificate to the server system in response to verifying the server certificate; and perform a software update over the wide area network while the electronic device is inside a container.

14. The system of claim 13, wherein the device identifier is provisioned to an authentication list of the server system prior to the electronic device exiting the shelf-life mode.

15. The system of claim 13, wherein verifying the connection ticket comprises:

wherein the connection ticket includes a message and a signature of the message, the signature generated using the private key of the server system, wherein verifying the connection ticket comprises:

verifying the signature using the message and a public key that corresponds to the private key.

16. The system of claim 13, wherein after performing the software update, the device identifier is removed from an authentication list at the server system.

* * * * *